(12) United States Patent
Vinogradov et al.

(10) Patent No.: US 8,196,834 B2
(45) Date of Patent: Jun. 12, 2012

(54) SCAN ENGINE WITH INTEGRATED OBJECT SENSOR IN ELECTRO-OPTICAL READERS

(75) Inventors: Igor Vinogradov, Oakdale, NY (US); Edward Barkan, Miller Place, NY (US); Robert Pang, Williston Park, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 12/834,215

(22) Filed: Jul. 12, 2010

(65) Prior Publication Data

US 2012/0006895 A1     Jan. 12, 2012

(51) Int. Cl.
*G06K 7/10*     (2006.01)
(52) U.S. Cl. ......... 235/462.01; 235/462.42; 235/462.45; 235/454; 235/472.01
(58) Field of Classification Search ............. 235/462.01, 235/462.42, 462.45, 454, 472.01
See application file for complete search history.

(56) References Cited

U.S. PATENT DOCUMENTS

| 4,613,895 | A | 9/1986 | Burkey et al. |
| 4,794,239 | A | 12/1988 | Allais |
| 5,280,162 | A | 1/1994 | Marwin |
| 5,304,786 | A | 4/1994 | Pavlidis et al. |
| 5,449,891 | A | 9/1995 | Giebel |
| 5,637,854 | A | 6/1997 | Thomas |
| 5,703,349 | A | 12/1997 | Meyerson et al. |
| 2006/0180670 | A1 | 8/2006 | Acosta et al. |
| 2009/0054787 | A1* | 2/2009 | Adler et al. .................. 600/476 |
| 2009/0264152 | A1* | 10/2009 | Soderlund ..................... 455/557 |

OTHER PUBLICATIONS

International Search Report and Written Opinion dated May 10, 2011 in related case PCT/US2010/062557.

* cited by examiner

*Primary Examiner* — Allyson Trail
(74) *Attorney, Agent, or Firm* — Nong-Qiang Fan (57) ABSTRACT

A scan module in a reader for, and a method of, electro-optically reading symbols, include a light source for directing light at a symbol during reading, a light detector for detecting return light from the symbol during reading and for generating an electrical signal indicative of the detected return light, and an object sensor for sensing an object bearing the symbol and for generating a trigger signal for initiating the reading. The light source, the light detector and the object sensor are all supported by a common chassis.

18 Claims, 5 Drawing Sheets

SCAN ENGINE WITH INTEGRATED OBJECT SENSOR IN ELECTRO-OPTICAL READERS

BACKGROUND OF THE INVENTION

Moving laser beam readers or laser scanners, as well as solid-state imaging systems or imaging readers, have both been used, both in a handheld and hands-free modes of operation, to electro-optically read one-dimensional bar code symbols, particularly of the Universal Product Code (UPC) type, each having a row of bars and spaces spaced apart along one direction, and two-dimensional symbols, such as Code 49, which introduced the concept of vertically stacking a plurality of rows of bar and space patterns in a single symbol, as described in U.S. Pat. No. 4,794,239. Another two-dimensional code structure for increasing the amount of data that can be represented or stored on a given amount of surface area is known as PDF417 and is described in U.S. Pat. No. 5,304,786.

The known moving laser beam reader generally includes a laser scan engine or module for supporting an electrically energizable laser for emitting a laser beam, a focusing lens assembly for focusing the laser beam to form a beam spot having a certain size at a focal plane in a range of working distances, an electrically energizable scan component for repetitively scanning the beam spot across a symbol in a scan pattern, for example, a scan line or a series of scan lines, across the target symbol multiple times per second, e.g., forty times per second, a photodetector for detecting laser light reflected and/or scattered from the symbol and for converting the detected laser light into an analog electrical signal, and electrical signal processing circuitry including a digitizer for digitizing the analog signal. Sometimes, the laser scan engine also supports a controller or microprocessor for controlling operation of the electrical components supported by the laser scan engine, and for decoding the digitized signal based upon a specific symbology used for the symbol.

The known imaging reader includes an imaging scan engine or module for supporting a solid-state, image sensor comprising an array of pixels or light sensors, for sensing return light from a target being imaged. The image sensor may be a one- or two-dimensional charge coupled device (CCD) or a complementary metal oxide semiconductor (CMOS) device, and is analogous to the image sensors used in electronic digital cameras. The target can be a symbol or a non-symbol. The imaging scan engine also supports an illuminating light assembly for illuminating the symbol with illumination light from an illumination light source, e.g., one or more light emitting diodes (LEDs); an imaging lens assembly, e.g., one or more imaging lenses, for capturing return ambient and/or illumination light scattered and/or reflected from the symbol over a field of view and over a range of working distances, as measured from a front of the reader; and electrical circuitry for producing electronic analog signals corresponding to the intensity of the light captured by the image sensor over the field of view, and for digitizing the analog signal. The imaging scan engine optionally supports an aiming light assembly for projecting a visible aiming light pattern, for example, a generally circular spot or cross-hairs for placement at the center of the symbol, to assist an operator in visually locating the symbol within the field of view prior to image capture, and a controller or microprocessor for controlling operation of the electrical components supported by the imaging scan engine, and for processing and/or decoding the digitized signal based upon a specific symbology used for the symbol.

It is therefore known to use the image sensor for capturing a monochrome image of the symbol as, for example, disclosed in U.S. Pat. No. 5,703,349. It is also known to use the image sensor with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

In some applications, the known laser and imaging scan engines are mounted in housings configured as stationary workstations, e.g., kiosks, or hands-free, fixed position, presentation scanners, having windows to which symbols are either presented, or across which the symbols are swiped. Some scan engines continuously capture and attempt to decode symbols without regard to whether or not a symbol is actually in the field of view. However, continuous, repetitive, flashing of bright light from the LEDs of the illuminating assembly in the case of the imaging scan engine, and continuous, repetitive, flashing of bright laser light from the laser in the case of the laser scan engine, consume and waste energy, degrade component lifetimes, and can be perceived as bothersome, distracting and annoying to the operators of the readers and to nearby consumers being served.

To alleviate these problems, the art has proposed periodically activating, i.e., waking-up, the scan engine with a few different approaches. For example, the scan engine can be operated with a very low duty cycle (about 10%). Thus, the scan engine wakes up for a very short period of time to scan the field of view and tries to detect a presence of a symbol therein. However, this creates sluggishness in the reader's performance and delays in decoding, which can be perceived as an engineering defect. Also, the distracting flashing laser light or illumination light is still present during the wake-up time period.

Another approach for the imaging engine tries to detect the symbol without energizing the illumination LEDs. However, under low ambient light conditions, for example, when a reader is located in a dark corner in a retail environment, the activation time will be slow since the exposure of the image sensor has to be very long in order to acquire an image of acceptable brightness for object detection. Again, the reader's performance is sluggish.

Still another approach for the imaging engine is to use the aiming pattern generated by the aiming assembly as auxiliary illumination for object detection. However, the engine activation is still somewhat slow (~40 ms) due to the time necessary to perform some image processing to detect the symbol and set the image sensor's parameters for proper image acquisition for decoding. Also, since the aiming pattern is typically limited to a central area of the field of view, the scan engine can be activated only if the symbol is present within the center of the field of view, which contributes further to sluggish performance.

As exemplified by U.S. Pat. Nos. 5,280,162 and 5,449,891, a stand-alone dedicated object sensor can be installed in a reader for activating the scan engine only if an object bearing a symbol is detected within the active field of view of the scan engine. However, such installations are complex and expensive and require optical alignment procedures to be performed. The object detection field of the object sensor is not guaranteed to match the field of view of the scan engine. The object sensing feature is therefore not readily capable of being incorporated into new apparatus.

SUMMARY OF THE INVENTION

One feature of the present invention resides, briefly stated, in a scan engine or module for use in a reader for electro-optically reading target indicia, especially bar code symbols. The reader includes a housing having a light-transmissive window. The scan module is mounted in the housing and includes a chassis; a light source supported by the chassis for directing light through the window at a symbol during reading; a light detector supported by the chassis for detecting return light from the symbol through the window during reading, and for generating an electrical signal indicative of the detected return light; and an object sensor supported by the chassis for sensing an object bearing the symbol, and for generating a trigger signal for initiating the reading. A controller or microprocessor is mounted either on or off the chassis. The controller is responsive to the trigger signal and is operative for controlling operation of the electrical components supported by the scan engine, and for processing the electrical signal into data corresponding to the symbol. The object sensor has thus been integrated on the scan engine.

In one embodiment where the scan engine is laser-based, the light source is a laser for emitting a laser beam. A focusing lens assembly is supported by the chassis for focusing the laser beam to form a beam spot in a range of working distances relative to the scan module. An electrically energizable scan component is also supported by the chassis for repetitively scanning the beam spot across the symbol in a scan pattern across the symbol. The light detector is a photodetector for detecting laser light returning from the symbol, and for converting the return laser light into the electrical signal.

In another embodiment where the scan engine is imager-based, the light source is an illuminating light source for illuminating the symbol with illumination light, and the light detector is a solid-state, image sensor having an array of pixels for detecting the illumination light returning from the symbol. An imaging lens assembly is also supported by the chassis for capturing the return illumination light over a field of view and over a range of working distances relative to the scan module. An optional aiming light assembly is likewise supported by the chassis for projecting a visible aiming light pattern on the symbol, to assist an operator in visually locating the symbol within the field of view prior to reading.

In either embodiment, the chassis advantageously includes a printed circuit board on which the light source, the light detector and the object sensor are commonly mounted. The object sensor includes an infrared light emitter for emitting infrared light at the object for return therefrom, and an infrared light sensor for monitoring the emitted infrared light returned from the object over a detection field that overlaps with a field of view of the light detector.

Advantageously, for the imager-based scan engine, the illuminating light source includes a pair of spaced-apart, light emitting diodes (LEDs) mounted at opposite sides of the image sensor on the printed circuit board. The infrared light emitter and the infrared light sensor are preferably mounted at the opposite sides of the image sensor. If the aiming light assembly is provided, then it is located between the infrared light emitter and the infrared light sensor on the printed circuit board. The chassis may also include a chassis cover on which lenses, e.g., the imaging lens, is mounted.

Another feature of the present invention resides, briefly stated, in a method of electro-optically reading symbols, which is performed by directing light at a symbol during reading by supporting a light source on a chassis; detecting return light from the symbol during reading, and generating an electrical signal indicative of the detected return light, by supporting a light detector on the chassis; and sensing an object bearing the symbol, and generating a trigger signal for initiating the reading, by supporting an object sensor on the chassis.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

As used herein, the term "symbol" broadly encompasses not only symbol patterns composed of alternating bars and spaces of various widths and commonly referred to as bar code symbols, but also other indicia, such as one- or two-dimensional graphic patterns, as well as alphanumeric characters, and even including non-symbols, such as signatures, driver's licenses, receipts, etc. The symbols can be printed on objects, or can be displayed on screens of such objects as cellular telephones. In general, the term "symbol" may apply to any type of pattern or characters, which may be recognized or identified either by scanning a light beam and detecting reflected or scattered light as a representation of variations in light reflectivity at various points of the pattern or characters, or by capturing ambient and/or illumination light from the pattern or characters to form an image to be processed.

Figure 1:
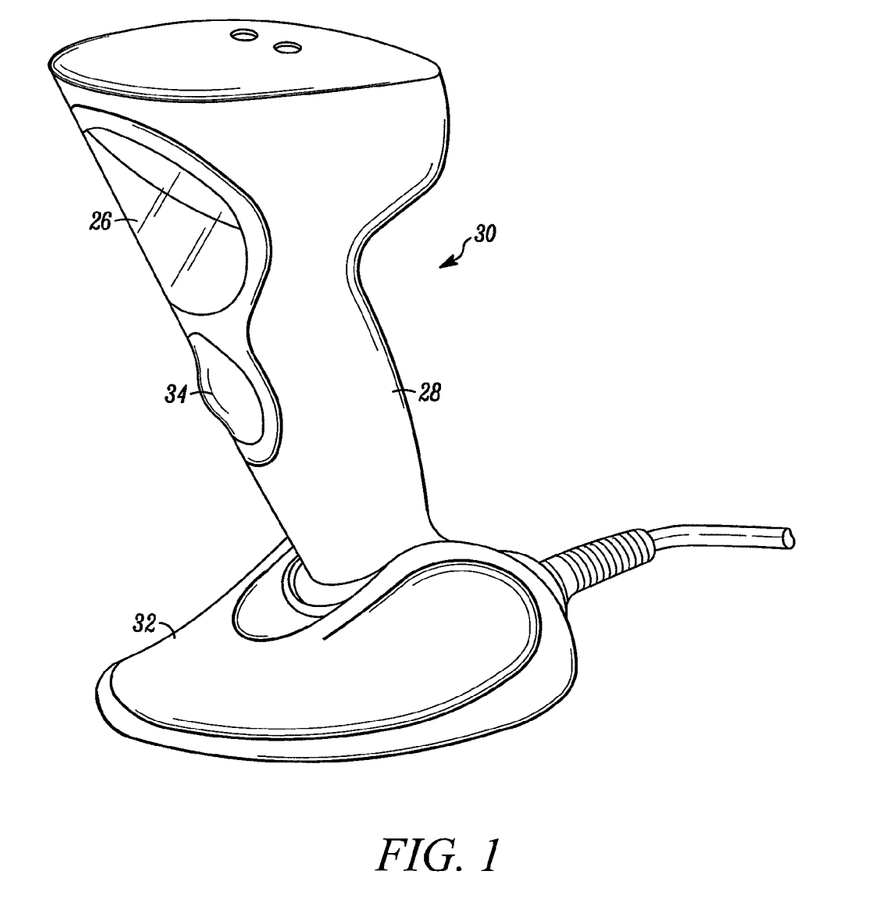
FIG. 1 is a perspective view of an electro-optical reader operative in either a handheld mode, or a hands-free mode, for electro-optically reading indicia.

Reference numeral 30 in FIG. 1 generally identifies an electro-optical reader having a window 26 and a gun-shaped housing 28 supported by a base 32 for supporting the reader 30 on a countertop. The reader 30 can thus be used in a hands-free mode as a stationary workstation in which objects or products are slid, swiped past, or presented to, the window 26, or can be picked up off the countertop and held in an operator's hand and used in a handheld mode in which a trigger 34 is manually depressed to initiate reading of indicia, especially one-dimensional symbols, to be read. In another variation, the base 32 can be omitted, and housings of other configurations can be employed. The housing can also be permanently fixed to a stationary support. A cable, as illustrated in FIG. 1, connected to the base 32 can also be omitted, in which case, the reader 30 communicates with a remote host by a wireless transceiver, and the reader is electrically powered by an on-board battery.

Figure 2:
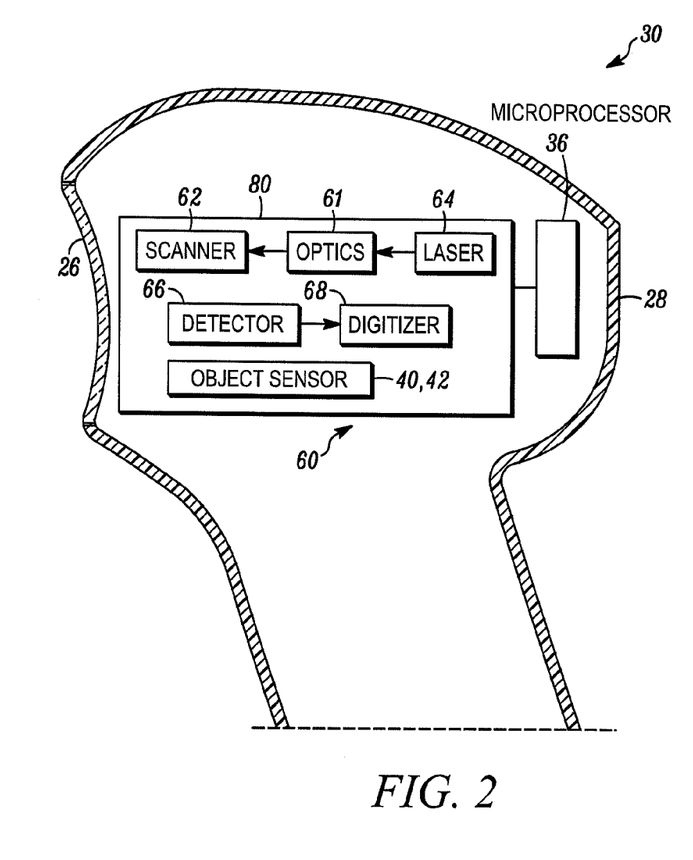
FIG. 2 is a broken-away, partly schematic view of a moving laser beam reader for electro-optically reading indicia having a laser scan engine integrated with an object sensor in accordance with the present invention.

FIG. 2 schematically depicts a laser scan engine 60 or module mounted in the reader 30. The laser scan engine 60 includes a chassis 80 for supporting an electrically energizable laser 64 for emitting a laser beam, a focusing lens assembly or optics 61 for focusing the laser beam to form a beam spot having a certain size at a focal plane in a range of working distances, an electrically energizable scan component 62 for repetitively scanning the beam spot across a symbol in a scan pattern, for example, a scan line or a series of scan lines, across the target symbol multiple times per second, e.g., forty times per second, a photodetector 66 for detecting laser light reflected and/or scattered from the symbol and for converting the detected laser light into an analog electrical signal, and electrical signal processing circuitry including a digitizer 68 for digitizing the analog signal. Sometimes, the laser scan engine 60 also supports a controller or microprocessor 36 for controlling operation of the electrical components supported by the laser scan engine 60, and for decoding the digitized signal based upon a specific symbology used for the symbol.

Figure 3:
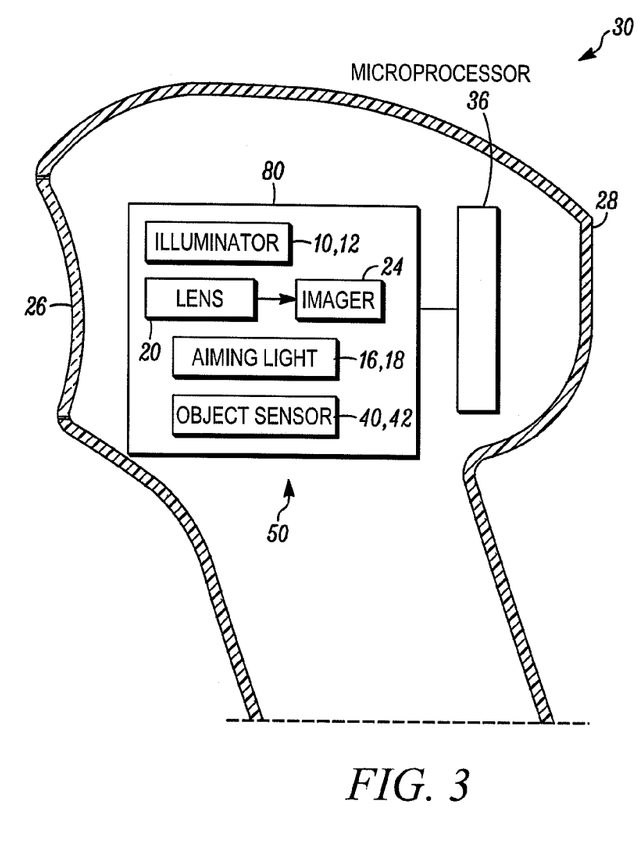
FIG. 3 is a broken-away, partly schematic view of an imaging reader for electro-optically reading indicia having an imaging scan engine integrated with an object sensor in accordance with the present invention.

FIG. 3 schematically depicts an imaging scan engine 50 or module, alternatively mounted in the reader 30. The imaging scan engine 50 includes a chassis 80 for supporting a solid-state, image sensor 24 comprising an array of pixels or light sensors, for sensing return light from a target being imaged. The image sensor 24 may be a one- or two-dimensional charge coupled device (CCD) or a complementary metal oxide semiconductor (CMOS) device, and is analogous to the image sensors used in electronic digital cameras. The target can be a symbol or a non-symbol. The imaging scan engine 50 also supports an illuminating light assembly 10, 12, as described in more detail below, for illuminating the symbol with illumination light from an illumination light source; an imaging lens assembly, e.g., one or more imaging lenses 20, for capturing return ambient and/or illumination light scattered and/or reflected from the symbol over a field of view and over a range of working distances, as measured from a front of the reader; and electrical circuitry for producing electronic analog signals corresponding to the intensity of the light captured by the image sensor over the field of view, and for digitizing the analog signal.

The imaging scan engine 50 optionally supports an aiming light assembly 16, 18, as described in more detail below, for projecting a visible aiming light pattern, for example, a generally circular spot or cross-hairs for placement at the center of the symbol, to assist an operator in visually locating the symbol within the field of view prior to image capture. Sometimes, the imaging scan engine 50 also supports a controller or microprocessor 36 for controlling operation of the electrical components supported by the imaging scan engine 50, and for processing and decoding the digitized signal based upon a specific symbology used for the symbol.

Figure 4:
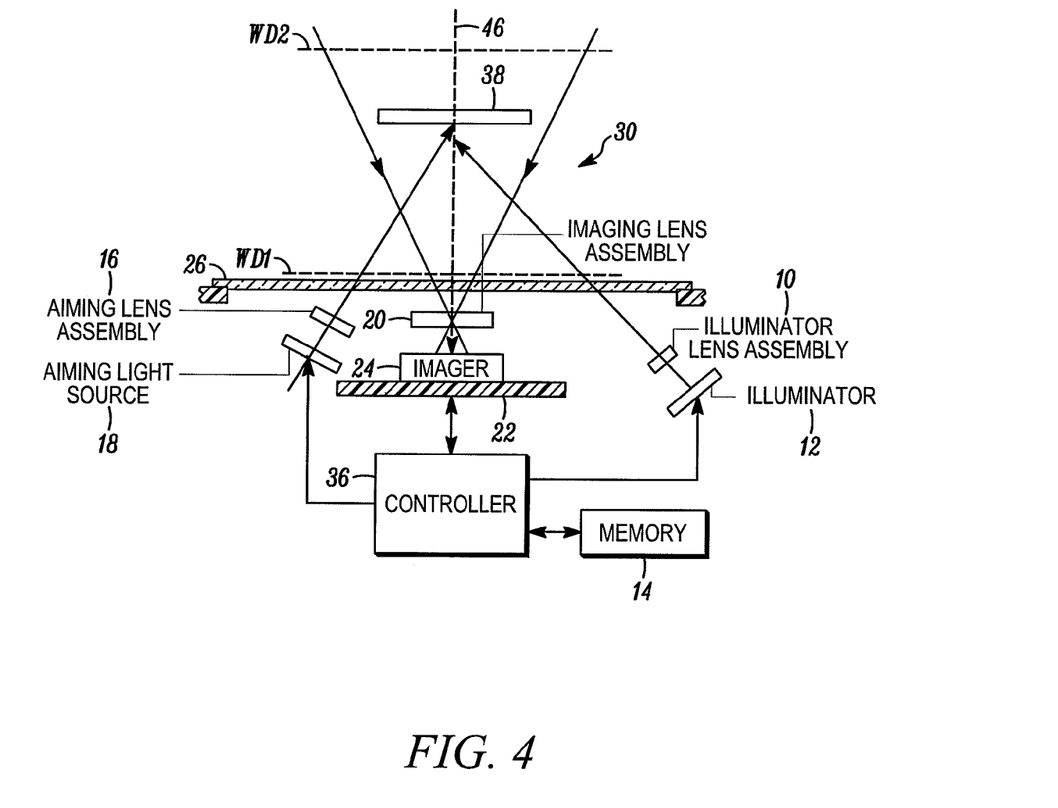
FIG. 4 is a schematic diagram of various components of the reader of FIG. 1.

As shown in FIG. 4, the sensor 24 is mounted on a printed circuit board (PCB) 22, which constitutes a part of the chassis 80. The imaging lens assembly 20 captures the return light over a field of view along an optical path or axis 46 through the window 26. The return light is scattered and/or reflected from a target or symbol 38 over the field of view. The symbol 38 is located anywhere in a working range of distances between a close-in working distance (WD1) and a far-out working distance (WD2). In a preferred embodiment, WD1 is about a half inch from the window 26, and WD2 can be many feet from the window 26.

Figure 5:
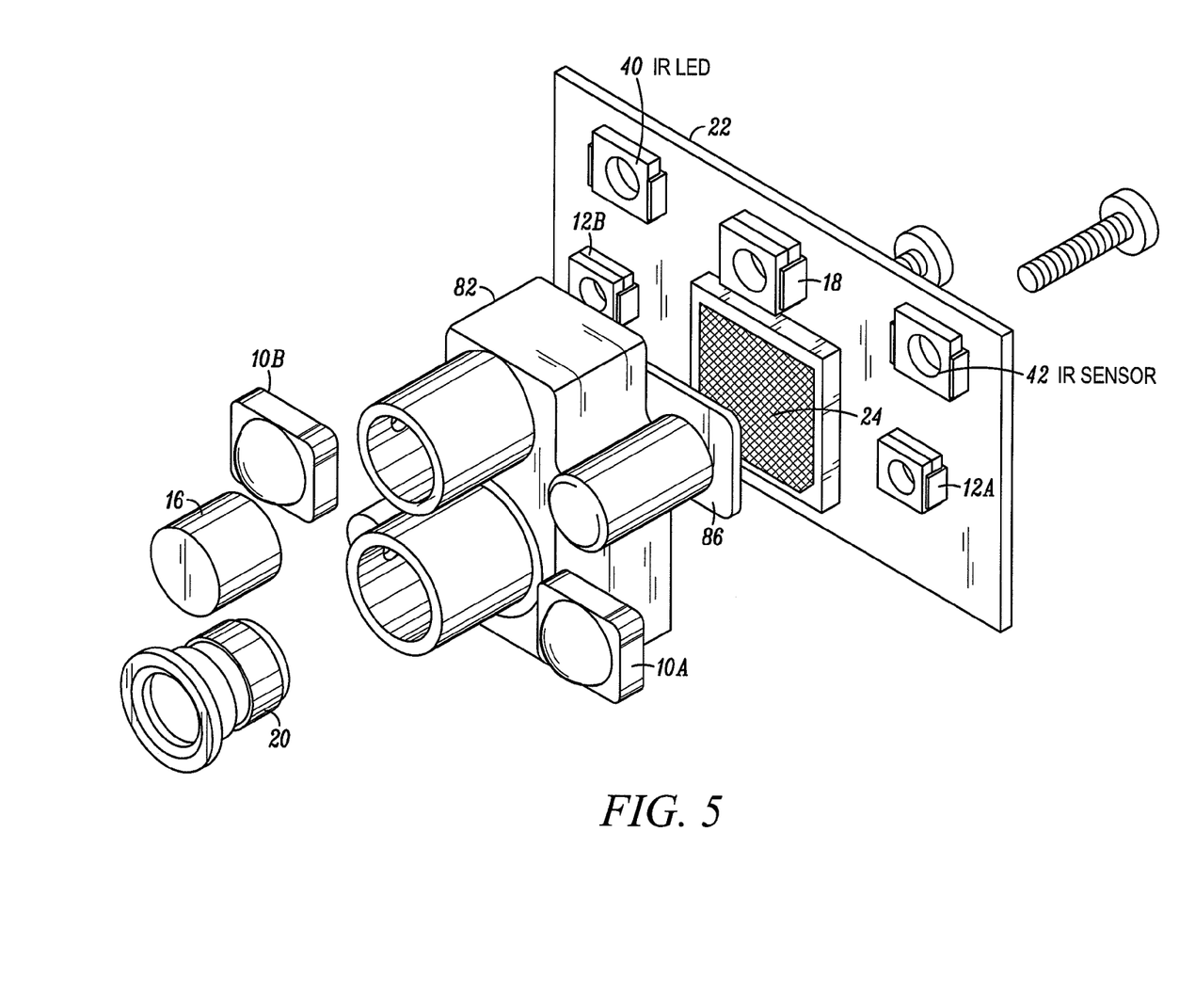
FIG. 5 is an exploded perspective view of an imaging scan engine for use in the reader of FIG. 3.
Figure 6:
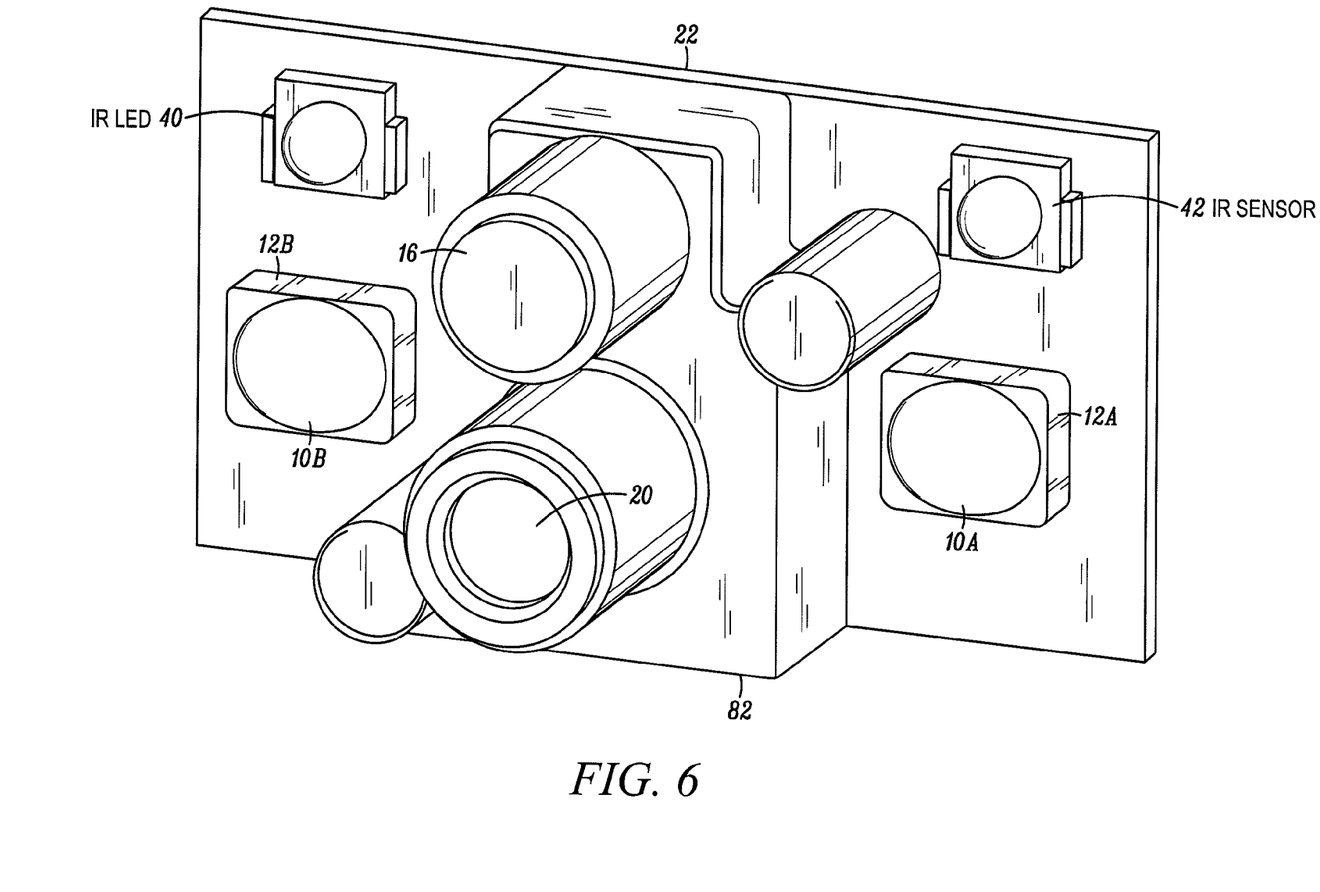
FIG. 6 is an assembled perspective view of the imaging scan engine of FIG. 5.

The illuminating assembly preferably includes an illuminator or illuminating light source 12, e.g., a pair of light emitting diodes (LEDs) 12A, 12B, as shown in FIGS. 5-6, and an illuminating lens assembly 10, e.g., a corresponding pair of illumination lenses 10A, 10B, as also shown in FIGS. 5-6, to uniformly illuminate the symbol 38 with an illuminating light pattern. Details of the illuminating assembly, as best seen in FIGS. 5-6, are described below.

The aiming assembly preferably includes an aiming light source 18, e.g., an aiming LED, and an aiming lens 16 for generating an aiming light pattern on the symbol 38. Details of the aiming assembly, as also best seen in FIGS. 5-6, are described below.

As shown in FIG. 4, the image sensor 24, the illuminating light source 12 and the aiming light source 18 are operatively connected to a controller or microprocessor 36 operative for controlling the operation of these components. A memory 14 is connected and accessible to the controller 36. Preferably, the microprocessor is the same as the one used for processing the return light from target symbols and for decoding the captured target images.

In operation of the imaging scan engine 50, the controller 36 sends command signals to drive the aiming LED 18 to project the aiming pattern on the target prior to reading, and then to drive the illumination LEDs 12A, 12B for a short time period, say 500 microseconds or less, and to energize the image sensor 24 during an exposure time period of a frame to collect light from the target during said time period. A typical array needs about 16-33 milliseconds to read the entire target image and operates at a frame rate of about 30-60 frames per second. The sensor 24 may have on the order of one million addressable pixels.

As best shown in FIGS. 5-6, the pair of illumination LEDs 12A, 12B are spaced apart from each other and surface-mounted on the PCB 22, and the pair of illuminating lenses 10A, 10B are mounted on the illumination LEDs 12A, 12B, for optically modifying the illumination light emitted from the illumination LEDs 12A, 12B. The illumination LEDs 12A, 12B and the illuminating lenses 10A, 10B are preferably symmetrically located at opposite sides of the image sensor 24, which is also surface-mounted on the PCB 22. The illumination LEDs 12A, 12B are preferably pulsed for the exposure time period. Optionally, the aiming LED 18 is also surface-mounted on the PCB 22 midway between the illumination LEDs 12A, 12B, and above the sensor 24.

A chassis cover 82 overlies the PCB 22 and is connected thereto by the illustrated fasteners. The chassis cover 82 holds the imaging lens 20 in front of the sensor 24, and also holds the aiming lens 16 in front of the aiming LED 18, and encloses the sensor 24 from stray light. A cover glass 86 overlies and protects the image sensor 24. All of the assembled components in FIG. 6 are collectively known as an imaging scan engine.

In accordance with this invention, an object sensor is supported by the chassis 80 of either laser scan engine 60 (FIG. 2) or imaging scan engine 50 (FIG. 3) for sensing an object bearing the symbol 38, and for generating a trigger signal for initiating the reading. The trigger signal is conducted to the controller 36. The object sensor includes an infrared (IR) light emitter, such as IR LED 40, for emitting IR light, which is invisible to the human eye, in a wavelength range from about 700 nm to about 1100 nm, at the object for return therefrom, and an IR light sensor 42 for monitoring the emitted IR light returned from the object over a detection field that overlaps with the field of view of the imaging lens 20 or the detector 66 in such a way that the scan engine 50, 60 is activated only if the object is within the field of view. The viewing angle of the IR LED 40 is approximately equal to the detection field of the IR sensor 42 for better system efficiency and pointing in the direction of the object of interest. The IR sensor 42 may have additional optics and an aperture to more accurately match the field of view of the imaging lens. The IR LED 40 and the IR sensor 42 are surface-mounted on the PCB 22 at opposite sides of, and above, the image sensor 24, preferably flanking the aiming LED 18.

The IR sensor 42 may have a daylight filter to improve the signal-to-ambient light ratio for better performance. The daylight filter substantially blocks visible light in the range from about 350 nm to about 700 nm and lets the IR light pass. A narrow bandpass filter could also be beneficial. In another preferred embodiment the IR LED 40 and the IR sensor 42 can be packaged in close proximity with each other and implemented as one single integrated component located on the same side of the aiming LED 18.

The controller 36 implements an algorithm to determine if an object is present by monitoring the reflected IR light emitted from the IR LED 40 using the IR sensor 42. At initialization, the controller 36 will baseline the background ambient light using an analog-to-digital converter to adjust gain so as to not saturate under various lighting conditions. After initialization, the thresholds are set, either in software or hardware, preferably by the controller 36 for indicating the presence or absence of the object. In the embodiment where a hardware threshold is set, the controller 36 may enter a reduced power state while the external hardware monitors the level of the reflected IR light. In the event that the threshold is exceeded, then the hardware may wake up the controller 36 via the trigger signal. Alternatively, the controller 36 may also pulse the illumination LEDs 12A, 12B at a known frequency and detect the reflected light at said known frequency as a method of filtering other sources of light emitted with the same IR LED wavelength.

It will be understood that each of the elements described above, or two or more together, also may find a useful application in other types of constructions differing from the types described above.

While the invention has been illustrated and described as embodied in scan engines with integrated object sensors in electro-optical readers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A scan module for use in electro-optically reading symbols, comprising:
   a chassis including a chassis cover;
   a light source supported by the chassis for directing light at a symbol during reading;
   a light detector supported by the chassis for detecting return light from the symbol during reading, and for generating an electrical signal indicative of the detected return light;
   a lens assembly held in place by the chassis cover and positioned within a through-hole on the chassis cover in front of the light detector;
   an object sensor supported by the chassis for sensing an object bearing the symbol, and for generating a trigger signal for initiating the reading; and
   wherein the chassis includes a printed circuit board on which the light source, the light detector and the object sensor are commonly mounted.

2. The scan module of claim 1, wherein the light source is a laser for emitting a laser beam; and a focusing lens assembly supported by the chassis for focusing the laser beam to form a beam spot in a range of working distances relative to the scan module, the focusing lens assembly including the lens assembly held by the chassis cover; and an electrically energizable scan component supported by the chassis for repetitively scanning the beam spot across the symbol in a scan pattern across the symbol; and wherein the light detector is a photodetector for detecting laser light returning from the symbol, and for converting the return laser light into the electrical signal.

3. The scan module of claim 1, wherein the light source is an illuminating light source for illuminating the symbol with illumination light; wherein the light detector is a solid-state, image sensor having an array of pixels for detecting the illumination light returning from the symbol; and an imaging lens assembly supported by the chassis for capturing the return illumination light over a field of view and over a range of working distances relative to the scan module, the imaging lens assembly including the lens assembly held by the chassis cover.

4. The scan module of claim 3; and an aiming light assembly supported by the chassis for projecting a visible aiming light pattern on the symbol, to assist an operator in visually locating the symbol within the field of view prior to reading.

5. The scan module of claim 3, wherein the illuminating light source includes a pair of spaced-apart, light emitting diodes (LEDs) mounted at opposite sides of the image sensor; wherein the object sensor includes an infrared light emitter for emitting infrared light at the object for return therefrom, and an infrared light sensor for monitoring the emitted infrared light returned from the object; and wherein the infrared light emitter and the infrared light sensor are mounted at the opposite sides of the image sensor.

6. The scan module of claim 5, and an aiming light assembly supported by the chassis for projecting a visible aiming light pattern on the symbol, to assist an operator in visually locating the symbol within the field of view prior to reading; and wherein the aiming light assembly is located between the infrared light emitter and the infrared light sensor.

7. The scan module of claim 1, wherein the object sensor includes an infrared light emitter for emitting infrared light at the object for return therefrom, and an infrared light sensor for monitoring the emitted infrared light returned from the object.

8. The scan module of claim 1, wherein the light detector detects the return light over a field of view; and wherein the object sensor includes an infrared light emitter for emitting infrared light at the object for return therefrom, and an infrared light sensor that monitors the return infrared light over a detection field that overlaps the field of view of the light detector.

9. A reader for electro-optically reading symbols, comprising:
   a housing having a light-transmissive window;
   a scan module mounted in the housing, the scan module including a chassis having a chassis cover, a light source supported by the chassis for directing light through the window at a symbol during reading, a light detector supported by the chassis for detecting return light from the symbol through the window and through a lens assembly during reading and for generating an electrical signal indicative of the detected return light, the lens assembly being held in place by the chassis cover and positioned within a through-hole on the chassis cover in front of the light detector, and an object sensor supported by the chassis for sensing an object bearing the symbol, and for generating a trigger signal for initiating the reading;

a controller responsive to the trigger signal and operative for processing the electrical signal into data corresponding to the symbol; and wherein the chassis includes a printed circuit board on which the light source, the light detector and the object sensor are commonly mounted.

10. The reader of claim 9, wherein the object sensor includes an infrared light emitter for emitting infrared light at the object for return therefrom, and an infrared light sensor for monitoring the emitted infrared light returned from the object.

11. A method of electro-optically reading symbols, comprising the steps of:

directing light at a symbol during reading by supporting a light source on a chassis having a chassis cover;

detecting return light from the symbol through a lens assembly with a light detector during reading, and generating an electrical signal indicative of the detected return light, by supporting the light detector on the chassis and by holding a lens assembly rigidly in front of the light detector within a through-hole on the chassis cover;

sensing an object bearing the symbol, and generating a trigger signal for initiating the reading, by supporting an object sensor on the chassis; and commonly mounting the light source, the light detector and the object sensor on a printed circuit board.

12. The method of claim 11, wherein the directing step is performed by emitting a laser beam; and focusing the laser beam to form a beam spot in a range of working distances relative to the scan module by supporting a focusing lens assembly on the chassis, the focusing lens assembly including the lens assembly held by the chassis cover; and repetitively scanning the beam spot across the symbol in a scan pattern across the symbol by supporting an electrically energizable scan component on the chassis; and wherein the detecting step is performed by detecting laser light returning from the symbol, and converting the return laser light into the electrical signal.

13. The method of claim 11, wherein the directing step is performed by illuminating the symbol with illumination light; wherein the detecting step is performed by a solid-state, image sensor having an array of pixels for detecting the illumination light returning from the symbol; and capturing the return illumination light over a field of view and over a range of working distances relative to the scan module by supporting an imaging lens assembly on the chassis, the imaging lens assembly including the lens assembly held by the chassis cover.

14. The method of claim 13; and projecting a visible aiming light pattern on the symbol, to assist an operator in visually locating the symbol within the field of view prior to reading by supporting an aiming light assembly on the chassis.

15. The method of claim 14, wherein the illuminating step is performed by a pair of spaced-apart, light emitting diodes (LEDs) mounted at opposite sides of the image sensor; wherein the object sensing step is performed by emitting infrared light from an infrared light emitter at the object for return therefrom, and by monitoring the emitted infrared light returned from the object with an infrared light sensor; and mounting the infrared light emitter and the infrared light sensor at the opposite sides of the image sensor.

16. The method of claim 15, and projecting a visible aiming light pattern on the symbol, to assist an operator in visually locating the symbol within the field of view prior to reading by supporting an aiming light assembly on the chassis; and mounting the aiming light assembly between the infrared light emitter and the infrared light sensor.

17. The method of claim 11, wherein the object sensing step is performed by emitting infrared light at the object for return therefrom, and by monitoring the emitted infrared light returned from the object.

18. The method of claim 11, wherein the detecting step is performed by detecting the return light over a field of view; and wherein the object sensing step is performed by emitting infrared light at the object for return therefrom, and by monitoring the return infrared light over a detection field that overlaps the field of view of the light detector.

* * * * *